United States Patent [19]
Becraft et al.

[11] Patent Number: 5,911,910
[45] Date of Patent: Jun. 15, 1999

[54] METHOD AND APPARATUS FOR TRIGGERING AN ARTICLE CONTAINING AN OXIDIZABLE ORGANIC COMPOUND

[75] Inventors: Michael L. Becraft, Woodstock, Md.; R. Karina Sylvia, Greenville; Jeffrey A. Thomas, Greer, both of S.C.

[73] Assignee: Cryovac, Inc., Duncan, S.C.

[21] Appl. No.: 08/960,017

[22] Filed: Oct. 29, 1997

[51] Int. Cl.$^6$ .............................. C09K 15/02; C09K 15/04
[52] U.S. Cl. .................. 252/188.28; 53/428; 428/35.3; 428/35.7; 428/411.1
[58] Field of Search ........................................ 252/188.28

[56] References Cited

U.S. PATENT DOCUMENTS

| | | | |
|---|---|---|---|
| 5,211,875 | 5/1993 | Speer et al. .......................... | 252/188.28 |
| 5,310,497 | 5/1994 | Ve Speer et al. ................... | 252/188.28 |
| 5,350,622 | 9/1994 | Speer et al. .............................. | 428/215 |
| 5,399,289 | 3/1995 | Speer et al. ......................... | 252/188.28 |
| 5,425,896 | 6/1995 | Speer et al. ......................... | 252/188.28 |
| 5,498,364 | 3/1996 | Speer et al. ......................... | 252/188.28 |
| 5,811,027 | 9/1998 | Speer et al. ......................... | 252/188.28 |

FOREIGN PATENT DOCUMENTS

WO 94/12590  6/1994  WIPO.

*Primary Examiner*—Ellen M. McAvoy
*Attorney, Agent, or Firm*—Mark B. Quatt

[57] ABSTRACT

A method includes the steps of providing an article comprising an oxidizable organic compound; passing the article through a chamber; exposing the article, while in the chamber, to a source of actinic radiation at a wavelength, intensity and residence time sufficient to provide the article with a dose of actinic radiation of at least 100 mJ/cm$^2$; and exposing the article, while in the chamber, to a source of heat sufficient to raise the temperature inside the chamber to at least 55° F. An apparatus is also disclosed.

22 Claims, 3 Drawing Sheets

METHOD AND APPARATUS FOR TRIGGERING AN ARTICLE CONTAINING AN OXIDIZABLE ORGANIC COMPOUND

FIELD OF THE INVENTION

The invention relates generally to a method and apparatus for triggering an article, especially an article containing an oxidizable organic compound.

BACKGROUND OF THE INVENTION

It is well known that limiting the exposure of an oxygen sensitive product to oxygen maintains and enhances the quality and shelf life of the product For instance, by limiting the oxygen exposure of an oxygen sensitive food product in the packaging system, the quality of the food product is maintained by minimizing nutrients loss, slowing enzymatic and lipolytic oxidation, preventing photolytic degradation, and reducing spoilage. In addition, such packaging also keeps the product in inventory longer, thereby reducing restocking costs, and costs incurred from waste.

One means for limiting the exposure of a product to oxygen involves incorporating an oxygen scavenger into the packaging structure itself. This achieves a more uniform scavenging effect throughout the package. This may be especially important where there is restricted air circulation inside the package. In addition, such incorporation can provide a means of intercepting and scavenging oxygen as it passes through the walls of the package (herein referred to as an "active oxygen barrier"), thereby maintaining the lowest possible oxygen level throughout the package.

Oxygen scavengers that can be incorporated into a film structure are disclosed in U.S. Pat. Nos. 5,310,497, 5,350, 622 and 5,399,289 (Speer et al.), and a method of initiating oxygen scavenging generally is disclosed in U.S. Pat. No. 5,211,875 (Speer et al.). All of these four patents are incorporated herein by reference in their entirety. According to U.S. Pat. No. 5,350,622, oxygen scavengers are made of an ethylenically unsaturated hydrocarbon and transition metal catalyst. The preferred ethylenically unsaturated hydrocarbon may be either substituted or unsubstituted. The "oxygen scavenger" materials disclosed by Speer et al. are compounds which consume, deplete or reduce the amount of oxygen from a given environment.

Other oxygen scavengers which can be incorporated into a film structure are disclosed in PCT patent publication WO 94/12590 (Commonwealth Scientific and Industrial Research Organisation). These oxygen scavengers include at least one reducible organic compound which is reduced under predetermined conditions, the reduced form of the compound being oxidizable by molecular oxygen, wherein the reduction and/or subsequent oxidation of the organic compound occurs independent of the presence of a transition metal catalyst. The reducible organic compound is preferably a quinone, a photoreducible dye, or a carbonyl compound which has absorbence in the UV spectrum.

Oxygen scavengers are useful in modified atmosphere (MAP) and barrier packaging environments. However, oxygen scavengers often require, or at least benefit from, triggering in order to activate the oxygen scavenging properties.

In U.S. patent application Ser. No. 08/691,829 filed Aug. 2, 1996, now abandoned incorporated by reference herein in its entirety, an apparatus is disclosed which is beneficial in triggering oxygen scavenger films. This apparatus is especially useful when employed in a food processing plant or other facility where the triggering apparatus is located near a packaging machine. Thus disposed, an oxygen scavenger film can be triggered shortly before, and perhaps just a few seconds before, the film is used to package a food or other oxygen sensitive product.

Most packaging areas in food manufacturing facilities, such as meat processing plants, are typically kept at relatively low temperatures, on the order of 40° F. to 50° F.

The inventors have found that at these low temperatures the induction period (the time between exposure of an article to actinic radiation or other triggering mechanism, and the onset of oxygen scavenging by the article) can undesirably lengthen.

Also, at these low temperatures, the rate at which the triggered article will oxidize can be undesirably decreased.

Packaging materials containing an oxidizable organic compound exhibiting lengthy induction times must be held by the processor in inventory for a sufficient period of time before use. Thus, a longer induction time can be costly to the processor by resulting in increased inventory. If the packaging step occurs shortly after exposure to the triggering means, a delayed induction can mean that the oxygen sensitive product is disposed in the package for some time without the benefits of oxygen scavenging. In some cases, foods have a very high affinity to oxygen. This can result in a shortened shelf life for the package and/or reduction in product quality, because oxygen inside the package, or entering the package from the outside environment, can deleteriously affect the quality of the packaged product before the onset of oxygen scavenging. There is thus a competitive relationship for the available oxygen between the food and the packaging material.

Lowered oxygen scavenging rate can also have an adverse effect on product shelf life and/or quality. If the oxygen in the head space of a package is not removed quickly enough, then the detrimental effects of this oxygen on the packaged product (rancidity, spoilage due to growth of microorganisms, color change, etc.) are increased.

One possible solution to these problems is to use more of the oxygen scavenger, or if present more of the photoinitiator and/or catalyst, in the article. However, it has been found that although additional loading of the oxygen scavenging material in the article can increase the scavenging capacity of the article, it does not appreciably increase the rate at which the article scavenges.

A second possible solution is the use of a larger triggering unit of the type generally disclosed herein and in U.S. patent application Ser. No. 08/691,829, now abandoned. However, using additional banks of UV lamps, or otherwise increasing the level of actinic radiation incident on the film, does not necessarily result in an increase in scavenging rate in the triggered article.

Also, making the triggering unit larger is not desirable. On the contrary, it is much more convenient for the processor to use a unit which is small in size, in order to save valuable space in the facility, and in order to more easily physically integrate the triggering unit with an associated packaging machine.

The inventors have discovered that benefits in induction period and scavenging rate can be obtained by raising the temperature of the environment in which the triggering unit is located. One way to take advantage of this discovery would be to increase the overall ambient temperature of the processing/packaging facility in which the triggering and packaging operations occur. However, in the case of food, and especially meat packaging, this is not a feasible alternative because of the need to process and package these products in an overall relatively cool environment.

The inventors have found that benefits can be obtained by providing a means for heating, the means for heating disposed within a triggering chamber. The invention provides an effective method of and apparatus for triggering an article containing an oxidizable organic compound so as to result in a relatively short induction period, and enhanced oxygen scavenging rate, compared with an oxygen scavenging method and apparatus without the benefit of the invention.

Locating the means for heating inside the triggering chamber provides the additional benefit of warming the radiation bulbs to reduce startup time and thereby increase overall production rates.

The method and apparatus preferably allow the article to be triggered immediately prior to use during packaging of an oxygen sensitive product; and preferably provide a compact triggering means.

Preferably, an apparatus is provided which is readily incorporated in-line into existing packaging systems for triggering articles at or immediately prior to packaging.

DEFINITIONS

"Film" herein means a film, laminate, sheet, web, coating, or the like which can be used to package a product.

"Oxidizable organic compound", "oxygen scavenger", and the like herein mean a composition, compound, article or the like which can consume, deplete or react with oxygen from a given environment.

"Actinic radiation" and the like herein means electromagnetic radiation, in any form such as ultraviolet radiation or visible light, capable of causing a chemical change, and is exemplified in U.S. Pat. No. 5,211,875 (Speer et al.).

"Polymer" and the like herein means a homopolymer, but also copolymers thereof, including bispolymers, terpolymers, etc.

"Room temperature" herein is an ambient temperature from 20° C. to 25° C. (68° F. to 77° F.).

SUMMARY OF THE INVENTION

In a first aspect of the invention, a method comprises providing an article comprising an oxidizable organic compound; passing the article through a chamber; exposing the article, while in the chamber, to a source of actinic radiation at a wavelength, intensity, and residence time sufficient to provide the article with a dose of actinic radiation of at least 100 mJ/cm$^2$; and exposing the article, while in the chamber, to a source of heat sufficient to raise the temperature inside the chamber to at least 55° F.

In a second aspect of the invention, an apparatus comprises a chamber, the chamber comprising a means for emitting actinic radiation at a wavelength, intensity, and residence time sufficient to provide an article, the article having an oxidizable organic compound, with a dose of actinic radiation of at least 100 mJ/cm$^2$; a means for raising the temperature inside the chamber to at least 55° F.; and a means for feeding the article into and out of the chamber.

A preferred form of actinic radiation is UV light, and more preferably UV light with a wavelength of approximately 200–280 nm, sometimes referred to as UV-C light

BRIEF DESCRIPTION OF THE DRAWINGS

A detailed description of preferred embodiments of the invention follows, with reference to the attached drawings, wherein.

DESCRIPTION OF THE PREFERRED EMBODIMENTS

Figure 1:
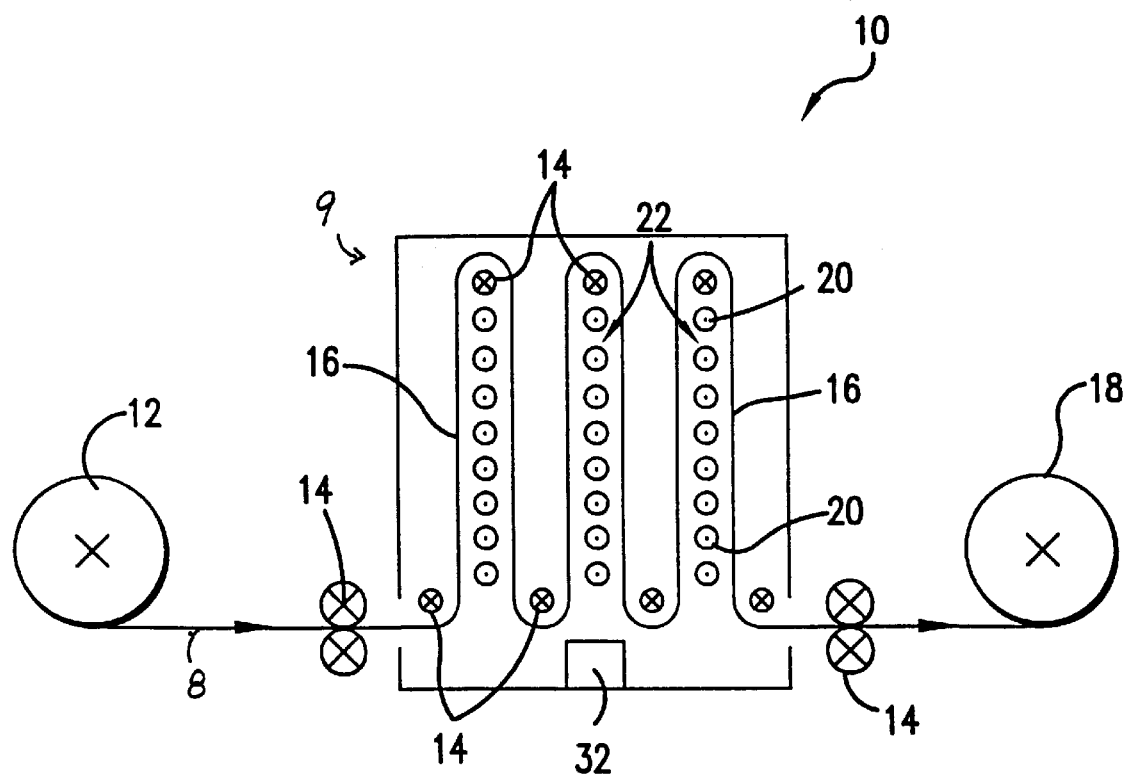
FIG. 1 schematically illustrates an apparatus useful in connection with the present invention.

The invention can be used in connection with various articles of manufacture, compounds, compositions of matter, coatings, etc. Two preferred forms are sealing compounds, and flexible films, both useful in packaging of food and non-food products. In addition to caps and closures, and traditional flexible film applications, the invention can be used in association with semirigid packaging, rigid containers, foamed and unfoamed trays, and paperboard liners, in systems where an oxygen scavenger has been triggered.

It is known to use sealing compounds in the manufacture of gaskets for the rigid container market. Large, wide diameter gaskets are typically made using a liquid plastisol. This plastisol is a highly viscous, liquid suspension of polymer particles in a plasticizer. In the manufacture of metal or plastic caps, lids, and the like, this liquid plastisol is applied to the annulus of a container such as a jar, and the container with the applied plastisol is "fluxed" in an oven to solidify the plastisol into a gasket. The result is a gasket formed around the annulus of the container.

Smaller gaskets are typically made for use in beer crowns in bottles. A polymer melt is applied by cold molding to the entire inner surface of the crown. Poly(vinyl chloride) (PVC) and other polymers are used in this application.

Discs for plastic caps are typically made by taking a ribbon of gasket material and making discs, and inserting the discs into the plastic cap.

In these applications, when an article comprising an oxidizable organic compound is to be triggered by exposure to actinic radiation, heating the article during triggering can beneficially enhance the oxygen scavenging rate of the triggered article.

The invention can be used in the packaging of a wide variety of oxygen sensitive products including fresh red meat such as beef, pork, lamb, and veal, smoked and processed meats such as sliced turkey, pepperoni, ham and bologna, vegetable products such as tomato based products, other food products, including baby food, beverages such as beer, and products such as electronic components, pharmaceuticals, medical products, and the like. The invention is readily adaptable to various vertical form-fill-and-seal (VFFS) and horizontal form-fill-and-seal (HFFS) packaging lines.

The invention is also adaptable to use in connection with shrink film-type packaging equipment.

A method and apparatus for triggering oxygen scavenging film are provided wherein an induction period of the film after triggering can be reduced to periods of preferably substantially less than one day, and whereby triggering can be incorporated preferably as an in-line step, preferably by an end user of the oxygen scavenging film, so as to reduce inventory problems with respect to triggered films.

As used herein, oxygen scavenger film refers to film having a compound which consumes, depletes or reduces the amount of oxygen from a given environment to which the film is exposed. The method and apparatus for triggering the oxygen scavenger film serves to trigger the film, leading to activation (usually within a relatively short time) of the oxygen scavenging capability of the film.

Films for use with the invention include an oxidizable organic compound, and preferably include both an oxidizable organic compound and a transition metal catalyst. Optionally, the oxygen scavenging film may also include photoinitiator compositions, antioxidants and other additives, for example as disclosed in U.S. Pat. No. 5,211,875. Preferred films contain oxidizable organic compound of substituted or unsubstituted ethylenically unsaturated hydrocarbon polymers, preferably having a molecular weight of at least 1000. More preferably, the oxidizable organic compound is selected from the group consisting of styrene/butadiene copolymers, styrene/isoprene copolymers, polybutadiene, polyisoprene, or mixtures thereof.

Films of the invention can also include ultraviolet stabilizers.

The transition metal catalyst of the oxygen scavenging film is preferably a transition metal salt of cobalt, manganese, or mixtures thereof. Other suitable transition metal catalysts are disclosed in U.S. Pat. No. 5,211,875.

The ethylenically unsaturated hydrocarbon and transition metal catalyst may be further combined with one or more polymeric diluents, such as thermoplastic polymers which are typically used to form film layers in plastic packaging materials. In the manufacture of certain packaging materials well known thermosets can also be used as the polymeric diluent. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. Blends of different diluents may also be used. The selection of the polymeric diluent depends in part on the product to be manufactured and the end use.

It has been discovered that exposing oxygen scavenging film to actinic radiation at certain wavelength, intensity, residence time and distance from the film, in an environment at a temperature of at least 55° F., results in a triggering of the oxygen scavenging properties of the film in a relatively short period of time, i.e. the induction period. UV light, and more preferably UV light of germicidal wavelengths (UV-C light), has been found particularly effective at triggering oxygen scavenging films. Preferred wavelengths are between 200 nm and 280 nm, such as 254 nm. Optimal wavelengths can be determined depending on the composition of the particular scavenging resin, and (if present) catalyst and photoinitiator.

As described in U.S. patent application Ser. No. 08/691,829, now abandoned, incorporated by reference herein in its entirety, oxygen scavenger films to be triggered are exposed to actinic radiation at the desired wavelength, at an intensity and residence time sufficient to provide the film with a dose of actinic radiation of at least 100 mJ/cm$^2$, preferably at least 200 mJ/cm$^2$, more preferably between 300 and 1600 mJ/cm$^2$, and most preferably between 400 and 800 mJ/cm$^2$. It has been found that, within this range, different doses of actinic radiation, combined with an environment at a temperature of at least 55° F., beneficially affects the scavenging rate of the film after triggering.

Preferred temperatures are between 55° F. and 120° F., such as between 60° F. and 100° F., and between 65° F. and 80° F., such as 70° F. All values between 55° F. and 120° F. are incorporated herein as if set forth individually.

The practical upper temperature limit depends on the residence time of the film in the chamber. For typical packaging operations, it is expected that 120° F. represents the upper temperature limit for the interior of the chamber. Higher temperatures could be utilized for short residence times, but it will be appreciated that at higher temperatures, physical damage to or deterioration of the film can occur, especially during prolonged exposure of the film to the elevated temperatures.

The intensity and residence time of actinic radiation may be utilized to provide the desired dose for a particular film. It is preferred to expose film to be triggered to actinic radiation at an intensity of at least 0.8 mW/cm$^2$, more preferably at least 2.0 mW/cm$^2$. In order to provide film paths which are not very long, film to be triggered is exposed more preferably to actinic radiation at an intensity of between 3.0 and 10 mW/cm$^2$, such as between 3.0 and 7.5 mW/cm$^2$. This intensity is provided at a distance from the source of actinic radiation to the film of preferably between 1 cm and 3 cm.

The desired dose of actinic radiation is provided to a particular film by traversing the film over a path having a particular length over which the film is exposed to the actinic radiation. At intensities as set forth above, oxygen scavenger film is usefully triggered over film paths preferably having a length between 0.5 m and 12 m, preferably 2 to 4 m and at average traveling speed of the film along the path of between 0.5 m/min and 30 m/min, typically 1.2 to 4 m/min. This procedure results in exposure times of the film to actinic radiation of typically between 15 and 90 seconds. The above described wavelength, intensity and residence time of actinic radiation have been found to trigger oxygen scavenger film to excellent oxygen scavenging rates, and with very small or negligible induction periods, thereby allowing the method of the present invention to be incorporated in-line to existing packaging methods so that oxygen scavenger film can be triggered at or shortly prior to packaging, and ameliorating problems related to storage and inventory of triggered oxygen scavenger films. Oxygen scavenger films thus triggered exhibit oxygen scavenging rates, depending upon the formulation and type of package to which the film is applied, of between 1 cc/m$^2$/day and 100 cc/m$^2$/day at temperatures of 40° F. (4° C.) when measured 4 days after triggering. For modified atmosphere packages (MAP) having a modified atmosphere headspace, (MAP, 1–2% O$_2$), triggered oxygen scavenger film exhibits an oxygen scavenging rate of between 20 and 66 cc/m$^2$/day at 4° C. when measured 4 days after triggering, thereby removing oxygen from the head space of such a package so as to reduce or eliminate adverse affects upon the product packaged therein.

The present invention can be used in a variety of package environments. For example, in addition to its use in MAP packaging, it can be used in connection with packages, including rigid containers, having an unmodified internal package environment, i.e. atmospheric air. The packaging film can be either an oxygen barrier film, or a film with relatively high oxygen transmission.

The invention can also be used in connection with packages, including rigid containers, having an internal package environment with an initially high amount of oxygen, e.g. higher than that present in atmospheric air. Here too, the packaging film can be either an oxygen barrier film, or a film with relatively high oxygen transmission.

In these alternative package systems, the final oxygen content of the internal package environment can be higher than 0.5% oxygen, yet still offer benefits to the packager, depending on the product being packaged, the nature of the packaging process, and other factors. In some cases, the invention can be used to reduce or eliminate the need to gas flush a package, thus saving a packaging step and reducing costs. The oxygen scavenger can serve both as an active barrier to the ingress of oxygen from outside the package, as well as a consumer of oxygen present inside the package, i.e. in the internal package environment.

Oxygen scavenger films, triggered as set forth above for use in high barrier long hold packages, exhibit oxygen scavenging rates of preferably between 1 and 10 cc/m$^2$/day when measured at room temperature, and 30 days after triggering, thereby providing a further oxygen barrier in the oxygen barrier layers of the package to which the oxygen scavenger film is applied, which oxygen scavenging exists over a longer period of time.

Triggered oxygen scavenger films can be used to rapidly reduce the residual oxygen content of a refrigerated MAP package to less than or equal to 0.5%, preferably less than or equal to 0.1% within less than or equal to 7 days, preferably less than or equal to 4 days and ideally as quickly as possible after product packaging. This allows packages that include the triggered oxygen scavenger film to be packaged with an initial residual oxygen content of 1 to 2% or higher. The oxygen scavenger film rapidly reduces the residual oxygen content to acceptable levels, and packaging at a higher initial residual oxygen content allows for faster machine cycles, thereby enhancing product output.

Referring now to the drawings, the method and apparatus for triggering oxygen scavenger film according to the invention will be further described in a preferred embodiment.

FIG. 1 illustrates a free standing triggering unit 10 having an unwind roll 12 for feeding film 8 to chamber 9, a series of rollers 14 defining a film path 16 through chamber 9, and a windup roll 18 for receiving triggered film for subsequent use. Chamber 9 includes a source of actinic radiation, e.g. a series of low pressure germicidal wavelength UV bulbs 20 arranged in banks 22, with film path 16 being arranged to pass a film relative to banks 22 so as to expose the film to the desired dose of UV-C light.

The oxygen scavenger film may include a number of layers, with the oxidizable organic compound and transition metal catalyst layer preferably being arranged toward one side thereof. Multilayer oxygen scavenger films are described in U.S. Pat. No. 5,350,622. It is preferable to expose only the oxidizable organic compound and the transition metal catalyst side of the multilayer film to UV-C light. Further, it is preferred that any layers of the multilayer film that are between the source of UV-C light and the oxygen scavenger film be effectively transparent at 254 nm. Thus, as illustrated in FIG. 1, film path 16 can be arranged so as to expose only one side of film to banks 22 of bulbs 20, although optionally both sides of the film can be exposed to bulbs 20.

It is preferred to provide film path 16 at a distance from banks 22 of bulbs 20 of between 1 cm and 3 cm, such as 2 cm.

Figure 2:
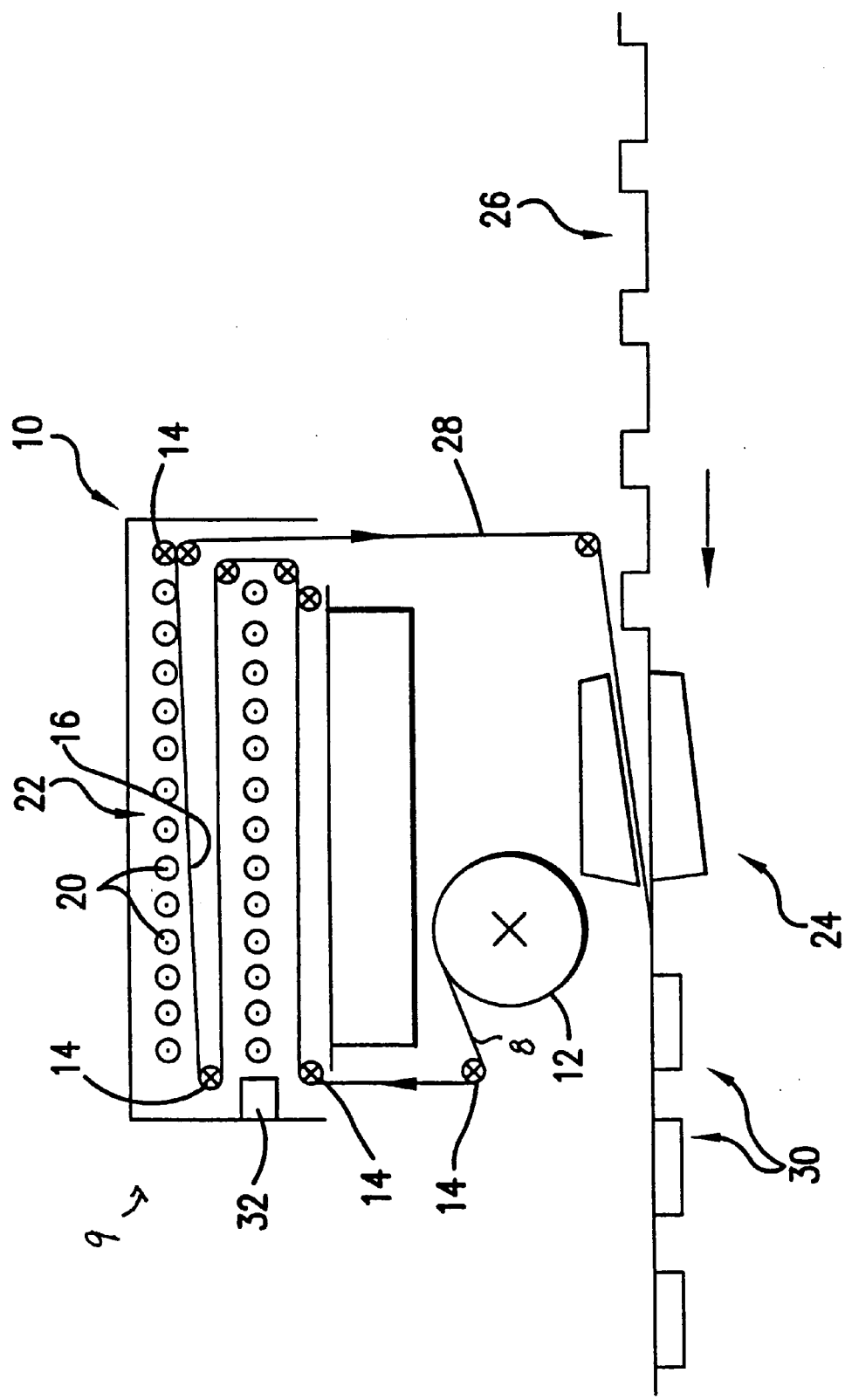
FIG. 2 schematically illustrates an apparatus useful in connection with the present invention, incorporated in-line into a packaging system.

FIG. 2 illustrates an embodiment of triggering unit 10 wherein triggering unit 10 is incorporated in-line into a packaging apparatus. Chamber 9 is positioned so as to receive film 8 from unwind roll 12, pass film along film path 16 for exposure to a source of actinic radiation, e.g. UV-C light, and feed triggered film 28 directly to a packaging unit, for example, sealing/gas flush dies 24. Triggered film 28 is immediately incorporated as a layer into packages along with formed web 26 supplied from other elements of the packaging assembly. Sealing/gas flush dies 24 serve to apply triggered film 28 to formed web 26 so as to provide packages 30 including triggered film.

Optionally, triggering unit 10 can be provided with a sensor unit 32 for monitoring the dose of UV-C light emitted by bulbs 20. This allows detection of deteriorating or malfunctioning bulbs 20. Sensor unit 32 can be, for example, an Online UV Intensity Display Module (EIT, Inc., Sterling, Va.) having 250–260 nm Standard UVI Sensors. Sensor unit 32 can be interlocked or operatively associated with a controller for the packaging line so that packaging can be automatically interrupted if UV-C light output is insufficient.

Bulbs 20 are preferably shielded to an effective intensity or irradiance E of less than or equal to 0.1 mW/cm$^2$, and are preferably provided with a sleeve member (not shown) for protecting the film in the film path 16 against contact with broken elements such as glass, etc., of a bulb 20, should bulb 20 break. The sleeve can be a shrinkable member or coating to be applied to bulbs 20. The preferred sleeve is a heat-shrunk FEP-Teflon® sleeve.

Bulbs 20 can be fluorescent tube-type bulbs, which preferably have a width sufficient to extend beyond either side of the width of a film to be treated. Bulbs have a width of preferably between 36 and 48 inches, which may be suitable for treating films having a width of up to 30 to 40 inches. Suitable bulbs are sold by Voltarc under part designation UV-LUX GRFX5194.

The step of exposing oxygen scavenger film to actinic radiation can optionally be carried out in a stepwise procedure wherein the film is exposed in a plurality of discrete periods of time. For example, if the intended exposure time or residence time is to be 40 seconds, the exposing step can be carried out in a series of four exposing steps, each 10 seconds long, preferably with a two second interval therebetween. Such stepwise exposure provides enhanced oxygen scavenging characteristics of the film triggered thereby. This embodiment is readily adaptable to packaging machines which operate with intermittent motion such as MULTIVAC™ R7000 distributed by KOCH of Kansas City, Mis.

Figure 3:
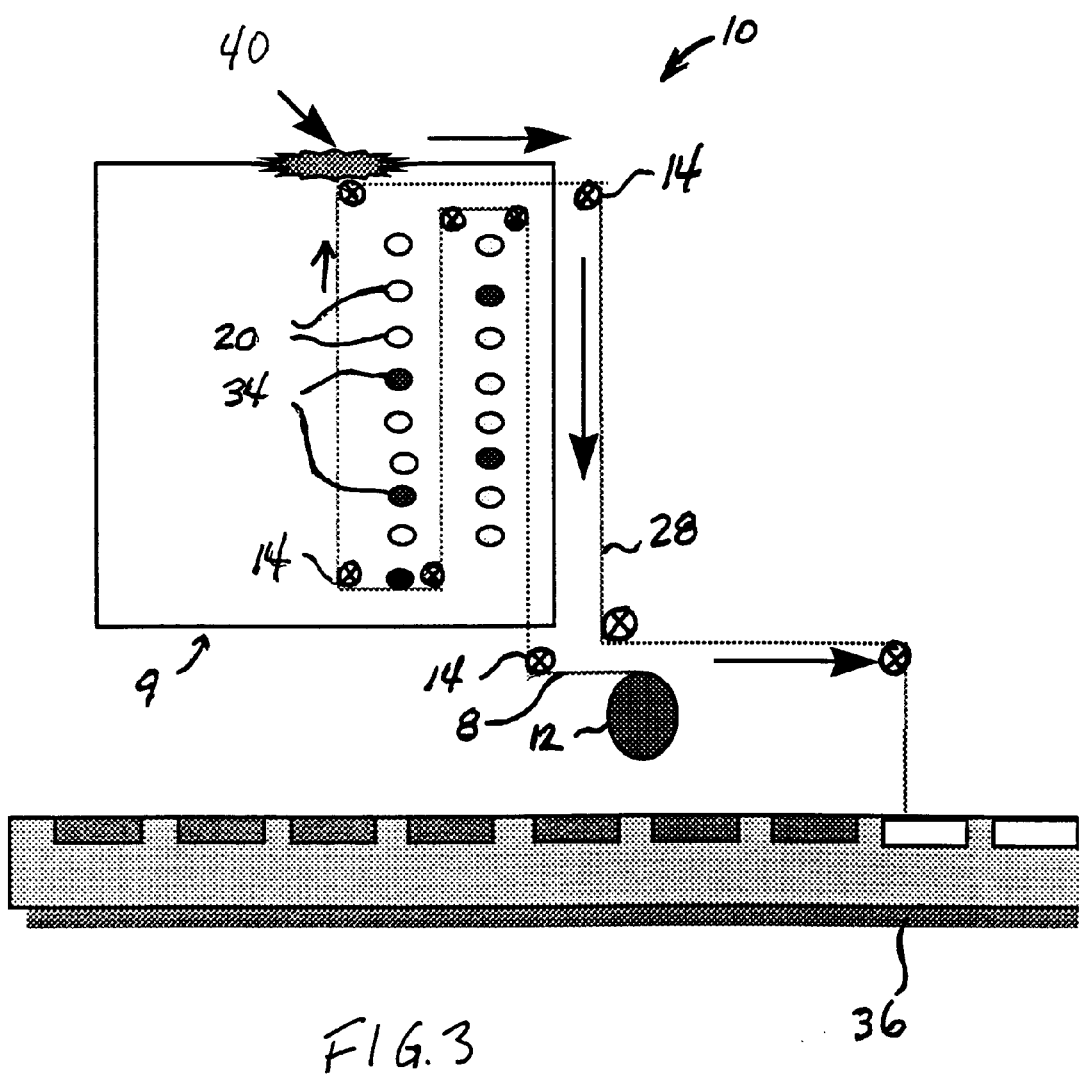
FIG. 3 schematically illustrate a method and apparatus in accordance with the invention.

FIG. 3 shows a triggering unit 10 in accordance with the invention, having an unwind roll 12 for feeding film 8 to a chamber 9, a series of rollers 14 defining a film path through chamber 9 of triggering unit 10, and a triggered film 28 advancing out of chamber 9, and towards package line 36. The direction in which the film moves is shown by the arrows. At the package line 36, the triggered film 28 is used to package an oxygen sensitive product, and the finished package is then advanced to a conveyor or other appropriate means for further processing. Triggering unit 10 includes a source of actinic radiation, such as a series of low pressure germicidal wavelength UV bulbs 20, with the film path being arranged to pass a film relative to bulbs 20 so as to expose the film to the desired dose of radiation such as UV-C light.

Means 34 for raising the temperature inside the chamber is used to raise the temperature of chamber 9 to at least 55° F. during the time that the film 8 is being triggered within the chamber. Means for heating 34 can be any suitable means, including, by way of example only, a consumer or commercial heated blower or heat gun, an infrared heater, a temperature-controlled cartridge heater with a suitable air circulation system; an enclosed hot water circulation system that exchanges heat with the chamber interior atmosphere; or any other suitable heating means. As shown in FIG. 3, the particular heating means employed is a series of infrared (IR) lamps or bulbs 34 suitably placed to effect heating of the chamber interior. In FIG. 3, IR bulbs are shown as darkened ellipses, and UV bulbs are shown as light-colored ellipses. Those skilled in the art will appreciate that the type and relative placement of heating means employed in connection with the invention can be determined, and optimized, depending on considerations such as size of the chamber, type of actinic radiation being used, type of film being triggered, desired scavenging rate, desired induction time, and the like. In the particular embodiment disclosed in FIG. 3, the IR bulbs 34 are interspersed with the UV bulbs, which provides relatively uniform heating to the chamber interior, and therefore to the film being triggered within the chamber. Whatever the heating means employed, care must be taken not to overexpose the film to heat, such that the film is undesirably altered in form or function.

Auxiliary fans 40 can be employed if desired to dissipate and/or distribute the heat generated by the means for heating.

The following examples are provided in order to further illustrate the advantageous features of the present invention.

EXAMPLES

Table 1 discloses the formulation of the film of Example 1. This material was triggered in a triggering unit of the type disclosed in FIGS. 1 and 3. Packages (10 cm×10 cm×3 cm) were made using a Multivac R7000 packaging machine, with T6070B, a standard laminate from Cryovac Division, W. R. Grace & Co. as the forming web. Packages were gas flushed with a mix of 1% $O_2$: 99% $N_2$. Samples were stored in corrugated boxes held at a temperature of about 40° F. until analysis. The percent oxygen was determined by a Headspace Scavenging Test (HST) protocol.

In the HST protocol, following the packaging step, a 5 cm×7.5 cm septum of 6 mil vinyl tape was applied to each pouch.

A first group of pouches were gas flushed with a premixed gas to yield a final volume of 300 to 350 cc gas. Premixed gas (Sunox, Inc./Charlotte, N.C.) was generally 1%$O_2$:99% $N_2$. These pouches were used to determine oxygen scavenging rate.

A second group of pouches were made up containing atmospheric air. These pouches were used to determine oxygen scavenging capacity.

Pouches containing the 1% $O_2$:99% $N_2$ gas mixture were stored in corrugated boxes at either 22° C. or 4.4° C. Gas samples were taken initially immediately after packaging, and every 24 hours thereafter, for up to 7 days.

For pouches containing atmospheric air, the amount of oxygen inside the pouches was determined every 7 days thereafter for up to 30 days.

Gas samples of about 5.1 cc were withdrawn from each pouch with a 5 cc Hamilton Gas Tight Syringe (VWR Scientific, Inc./Atlanta, Ga.). A Hamilton Point Style 5 22 gauge needle was used to prevent coring of septa. When drawing a gas sample, the vinyl tape septum was pierced once and immediately resealed with another of piece vinyl tape (2.5 cm×2.5 cm). Successive gas samples are withdrawn from an unpunctured portion of the vinyl septum. Time delay between sampling and injection was ≦2 sec. For each gas sample, the needle was flushed with 0.1 cc of the gas immediately prior to making the injection into the analyzer. 5 cc of the sample gas was then slowly injected into a Mocon LC-700F Oxygen Analyzer (Modern Controls, Inc./Minneapolis, Minn.) at a rate of 1 cc/sec. Data was recorded to 3 decimal places. Data was entered into an Excel spreadsheet (Microsoft Corporation/Redmond, Wash.) which automatically calculates cc $O_2$ scavenged, Average Rate, Instantaneous Rate, and Capacity. Rates are expressed in $cc/m^2/day$, while capacities are expressed in $cc/m^2/mil$. Typical values reported are: Average Rate at 4 days at 4.4° C., Peak Instantaneous Rate, Induction Period (if any), and Days to Peak Rate.

TABLE 1

Film Structure of Example 1

| Example | Outside Surface Layer | Adhesive | Bulk layer | Oxygen scavenging layer | Adjacent layers | |
|---|---|---|---|---|---|---|
| 1 | F1 | AD1 | 80% PE1 +20% Z1 | 40% OS1 +50% EVA1 +10% MB1 | 60% PP1 +40% EBA1 | LLDPE1 |
| gauge (mils) | 0.48 | minimal | 1.20 | .50 | 0.15 | 0.15 |

In Table 1:

F1=Saran-coated polyethylene terephthalate film (50 m-44 MYLAR™ from du Pont).

AD1=adhesive having a mixture of silane, isocyanate, glycol, and alkyl acetate (ADCOTE™ 530 and Coreactant 9L23 from Morton International).

PE1=low density polyethylene (POLY-ETH™ 1017 from Chevron).

Z1=a masterbatch of 80% linear low density polyethylene (LLDPE) and 20% UOP ABSCENTS® 2000 zeolite (10417-12 zeolite concentrate from Colortech).

OS1=styrene/butadiene copolymer with 30% by weight of the styrene comonomer, and 70% by weight of the butadiene comonomer (VECTOR™ 8508-D from Dexco Polymers).

EVA1=ethylene/vinyl acetate copolymer with a vinyl acetate content of 9% by weight of the polymer (ESCORENE™ LD-318.92 from Exxon).

PP1=polypropylene homopolymer (ESCORENE™ PP-4292.E1 from Exxon).

EBA1=ethylene/butyl acrylate copolymer with 30 wt. % butyl acrylate copolymer (LOTRYL™ 30BA$O_2$ from Elf Atochem).

LLDPE1=linear low density polyethylene, i.e. an ethylene/octene copolymer (DOWLEX™ 2244 A from Dow).

MB1=a compounded masterbatch formulation: 88.3% EVA1, 10.6% cobalt oleate, 1% benzoylbiphenyl, 0.1% IRGANOX™ 1076 stabilizer.

Table 2 illustrates the temperature/UV dose treatments. The effects of increased chamber temperature and increased UV dosage were examined by heating the chamber using a Masterflow Heat Blower (Model AH-501, 500° F.) and irradiating the film with 1 or 2 banks of lamps.

TABLE 2

Temperature/UV dose treatments for cold triggered Lidstock

| Example | Room Temp. (° F.) | | Chamber Temp.[a] (° F.) | | UV dose[b] (mJ/cm$^2$) |
|---|---|---|---|---|---|
| 1-A | Ambient | 64 | No heat | 79 | 800 |
| 1-B | Cold | 40 | No heat | 64 | 800 |
| 1-C | Cold | 45 | No heat | 77 | 1600 |
| 1-D | Cold | 42 | With heat | 97 | 800 |
| 1-E | Cold | 42 | With heat | 130 | 1600 |

[a]Heat was transferred through chamber using a shrink film drier.
[b]1 Bank ~ 800 mJ/cm$^2$, 2 Banks ~ 1600 mJ/cm$^2$.

Scavenging results for this test are illustrated in Table 3. Results showed that either increasing the chamber temperature (compare Example 1-B with Example 1-D) or the UV dosage to 1600 mJ/cm$^2$ (compare Example 1-B with Example 1-C) significantly increased the scavenging rates and reduced the induction times of material triggered at cold temperatures. Furthermore, the use of both increased heat and increased UV dosage (see Example 1-E) reduced the induction time to less than 24 hours and raised peak rates closer to those obtained with film scavenged at room temperature (see Example 1-A). It can also be seen, that the scavenging rates of either heated or highly dosed materials are similar to the rates of material that was triggered at room temperatures.

TABLE 3

Scavenging Performance of Cold-Triggered LOP/Lidstock film

| Film: Treatment | Average Rate[a] cc/m$^2$ day | | Induction Period (days) | Peak Inst. Rate (cc/m$^2$ day) | | Time to Reach Peak (days) |
|---|---|---|---|---|---|---|
| | Mean | St. dev. | | Mean | St. dev. | |
| 1-A: Ambient temp., no heat, 1 bank | 52.2 | 4.26 | 2 | 90.37 | 5.91 | 3–4 |
| 1-B: Cold, no heat, 1 bank | 15.00 | [b] | 4 | 58.69 | [b] | 4 |
| 1-C: Cold, no heat 2 banks | 52.46 | 5.89 | 2 | 87.93 | 4.3 | 3–4 |
| 1-D: Cold, with heat, 1 bank | 50.62 | 3.18 | 2 | 76.95 | 1.79 | 3 |
| 1-E: Cold, with heat, 2 banks | 60.23 | 9.44 | <1 | 85.45 | 14.4 | 3 |

[a]Average rate after 4 days.
[b]One data point.

Thus, it was observed that increasing the chamber temperature or increasing the UV dosage increased the scavenging rates and reduced the induction time of cold triggered films. In combination, heating and increasing the UV dose, further optimized the induction time of these films.

Another way of evaluating the efficacy of the present method and apparatus, especially when dealing with packaging having an initial level of oxygen of 1% or less, is to measure the volume of oxygen initially present in the package, and then the volume of oxygen present in the package several days after packaging.

Thus, the present invention provides a method and apparatus wherein a package, having an initial oxygen content of 0.5% at 40° F., has a residual oxygen content, within 7 days after packaging, of between 20% and 30%, such as 22%, of the initial oxygen content of the package.

The present invention also provides a method and apparatus wherein a package, having an initial oxygen content of 0.5% at 40° F., has a residual oxygen content, within 14 days after packaging, of between 5% and 15%, such as 7%, of the initial oxygen content of the package.

The present invention also provides a method and apparatus wherein a package, having an initial oxygen content of 1.0% at 40° F., has a residual oxygen content, within 7 days after packaging, of between 30% and 40%, such as 35%, of the initial oxygen content of the package.

The present invention also provides a method and apparatus wherein a package, having an initial oxygen content of 1.0% at 40° F., has a residual oxygen content, within 14 days after packaging, of between 5% and 15%, such as 10%, of the initial oxygen content of the package.

All values falling between these stated values are included herein as if expressly set forth herein.

For packages with a relatively high initial oxygen content, e.g. 21% oxygen (atmospheric air), the amount of oxygen scavenging material present in the packaging material will typically be the limiting factor in determining the residual oxygen present in the package several days after triggering.

The invention is not limited to the illustrations described herein, which are deemed to be merely illustrative, and susceptible of modification of form, size, arrangement of parts and details of operation.

What is claimed is:

1. A method comprising:
    a) providing an article comprising an oxidizable organic compound;
    b) passing the article through a chamber;
    c) exposing the article, while in the chamber, to a source of actinic radiation at a wavelength, intensity, and residence time sufficient to provide said article with a dose of actinic radiation of at least 100 mJ/cm$^2$; and
    d) exposing the article, while in the chamber, to a source of heat sufficient to raise the temperature inside the chamber to at least 55° F.

2. The method according to claim 1, wherein said actinic radiation comprises UV light.

3. A method according to claim 2, wherein said UV light has a wavelength of between 200 and 280 nm.

4. A method according to claim 1, wherein said article is exposed to a source of actinic radiation at an intensity of at least 0.8 mW/cm$^2$.

5. A method according to claim 1, wherein said article is exposed to a source of actinic radiation at an intensity of between 3.0 and 10 mW/cm$^2$.

6. A method according to claim 1, wherein said article is exposed to a source of actinic radiation at a distance from said article of between 1 and 3 cm.

7. A method according to claim 1, wherein said article is exposed to a source of actinic radiation at an intensity and residence time sufficient to provide said article with a dose of actinic radiation of between 300 mJ/cm$^2$ and 1600 mJ/cm$^2$.

8. A method according to claim 1, wherein said exposing step further comprises exposing said article to said source of actinic radiation over a path of between 0.5 m and 12 m, and a speed of said article along said path of between 0.5 m/min and 30 m/min.

9. A method according to claim 1, wherein said exposing step comprises exposing said article to said source of actinic radiation for between 15 and 90 seconds.

10. A method according to claim 1 wherein the article comprises a film.

11. A method according to claim 1 comprising monitoring the dose of actinic radiation emitted by said source of actinic radiation.

12. A method according to claim 1 comprising shielding the source of UV-C light so that it has an effective irradiance E of less than or equal to 0.1 mW/cm$^2$.

13. A method according to claim 1, wherein said oxidizable organic compound has a molecular weight of at least 1000, and is selected from the group consisting of substituted ethylenically unsaturated hydrocarbon polymers, unsubstituted ethylenically unsaturated hydrocarbon polymers and mixtures thereof.

14. A method according to claim 1, further comprising a transition metal catalyst.

15. A method according to claim 1, wherein said triggered article has an oxygen scavenging rate of between 1 cc/m$^2$/day and 100 cc/m$^2$/day at 4° C.

16. A method according to claim 1, wherein said exposing step comprises exposing said article to said source of UV-C light in a plurality of discrete periods of time.

17. An apparatus comprising:
   a) a chamber, the chamber comprising a means for emitting actinic radiation at a wavelength, intensity, and residence time sufficient to provide an article, the article having an oxidizable organic compound, with a dose of actinic radiation of at least 100 mJ/cm$^2$;
   b) a means for raising the interior temperature of the chamber to at least 55° F.; and
   c) a means for feeding the article into and out of the chamber.

18. The apparatus of claim 17 wherein the means for raising the temperature of the chamber is selected from
   i) a heated blower;
   ii) a heat gun;
   iii) an infrared heater;
   iv) a temperature-controlled cartridge heater with an air circulation system; and
   v) an enclosed heated fluid circulation system that exchanges heat with the chamber interior atmosphere.

19. The method of claim 14 wherein the transition metal catalyst is selected from the group consisting of transition metal salt of cobalt, transition metal salt of manganese, and mixtures thereof.

20. The method of claim 1 comprising the step of exposing the article, while in the chamber, to a source of heat sufficient to raise the temperature inside the chamber to between 55° F. and 120° F.

21. The method of claim 1 comprising the step of exposing the article, while in the chamber, to a source of heat sufficient to raise the temperature inside the chamber to between 60° F. and 100° F.

22. The method of claim 1 comprising the step of exposing the article, while in the chamber, to a source of heat sufficient to raise the temperature inside the chamber to between 65° F. and 80° F.

* * * * *